United States Patent
Hegde et al.

(10) Patent No.: US 10,652,832 B1
(45) Date of Patent: May 12, 2020

(54) SYSTEMS AND METHODS TO ADJUST TRANSMISSION POWER IN ELECTRONIC DEVICES

(71) Applicant: Microsoft Technology Licensing, LLC, Redmond, WA (US)

(72) Inventors: Uday Sooryakant Hegde, Issaquah, WA (US); Prateek Agrawal, Redmond, WA (US); Andre Raymond Lochin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/426,756

(22) Filed: May 30, 2019

(51) Int. Cl.
 *H04W 52/18* (2009.01)
 *H04W 24/08* (2009.01)
 *H04W 88/02* (2009.01)

(52) U.S. Cl.
 CPC .......... *H04W 52/18* (2013.01); *H04W 24/08* (2013.01); *H04W 88/02* (2013.01)

(58) Field of Classification Search
 CPC ... H04W 52/18; H04W 52/248; H04W 88/02; H04W 24/08
 See application file for complete search history.

(56) References Cited

U.S. PATENT DOCUMENTS

| | | |
|---|---|---|
| 8,818,450 B2 | 8/2014 | Caballero et al. |
| 9,300,342 B2 | 3/2016 | Schlub et al. |
| 9,425,640 B2 | 8/2016 | Moran |
| 9,625,395 B2 | 4/2017 | Brannan |
| 9,812,875 B2 | 11/2017 | Nejatali et al. |
| 10,141,770 B2 | 11/2018 | Partovi |
| 10,211,681 B2 | 2/2019 | Roy et al. |
| 2012/0062424 A1* | 3/2012 | Hwang ............... H04B 1/3838 342/374 |

* cited by examiner

*Primary Examiner* — Keith Ferguson
(74) *Attorney, Agent, or Firm* — Ray Quinney & Nebeker P.C.; Paul N. Taylor (57) ABSTRACT

A method of controlling wireless communication performance in an electronic device includes accessing data containing material properties relating to a plurality of materials, transmitting a first test signal on a first transmission channel with a first antenna at a first location in the electronic device, receiving the first test signal on the first transmission channel with a second antenna at a second location in the electronic device, determining a housing material of the electronic device based on a measured attenuation of the first test signal received by the second antenna based upon the data containing transmission properties relating to a plurality of materials, and adjusting a transmission power of one of the first antenna and the second antenna based upon the material properties of the housing material.

20 Claims, 6 Drawing Sheets

SYSTEMS AND METHODS TO ADJUST TRANSMISSION POWER IN ELECTRONIC DEVICES

BACKGROUND

Background and Relevant Art

Mobile devices in daily usage are commonplace. Mobile devices commonly rely upon wireless communication to receive and transmit information for a user. Mobile devices are subject to accidental damage and daily wear and tear. Additionally, some users desire the ability to customize mobile devices as personal statements or fashion accessories.

Changing components of the electronic device, however, can interfere with the transmission rate of the housing. Changing a portion of the housing can block more of the signal and compromise performance, while changing the housing material can allow a higher power signal out of the housing material and exceed regulatory limits.

BRIEF SUMMARY

In some implementations, a method of controlling wireless communication performance in an electronic device includes accessing data containing material properties relating to a plurality of materials, transmitting a first test signal on a first transmission channel with a first antenna at a first location in the electronic device, receiving the first test signal on the first transmission channel with a second antenna at a second location in the electronic device, determining a housing material of the electronic device based on a measured attenuation of the first test signal received by the second antenna based upon the data containing transmission properties relating to a plurality of materials, and adjusting a transmission power of one of the first antenna and the second antenna based upon the material properties of the housing material.

In some implementations, an electronic device includes a first antenna, a second antenna, a processor in data communication with the first antenna and second antenna, and a hardware storage device in data communication with the processor. The hardware storage device has instructions stored thereon that, when executed by the processor, cause the processor to: access data containing material properties relating to a plurality of materials, transmit a first test signal on a first transmission channel with a first antenna at a first location in the electronic device, receive the first test signal on the first transmission channel with a second antenna at a second location in the electronic device, determine a housing material of the electronic device based on a measured attenuation of the test signal received by the second antenna based upon the data containing material properties relating to the plurality of materials, and adjust a transmission power of one of the first antenna and second antenna based upon the material properties of the housing material.

In some implementations, a method of controlling wireless communication performance in an electronic device includes accessing data containing transmission properties relating to a plurality of materials, transmitting a first test signal on a first transmission channel with a first antenna at a first location in the electronic device, receiving the first test signal on the first transmission channel with a second antenna at a second location in the electronic device, transmitting a second test signal on the first transmission channel with the second antenna at the first location in the electronic device, receiving the second test signal on the first transmission channel with the first antenna at the second location in the electronic device, determining a housing material of the electronic device based on a measured attenuation of the first test signal received by the second antenna, the second test signal received by the first antenna, and the data containing transmission properties relating to a plurality of materials, and adjusting a transmission power of the primary antenna based upon the transmission properties of the housing material.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

This disclosure generally relates to devices, systems, and methods for adjusting a transmission power in a wireless communication antenna based on a detected material of a component of an electronic device. An electronic device may include parts that may be replaceable. Some of these replaceable parts may be of different materials than the original part. For instance, a metallic part may be replaced by part that is made of fabric, wood, plastic, composites, or other materials, or combinations thereof. The material may have a different property (e.g., transmissivity) than the original part. These different properties may result in different characteristics of the signal generated by the antenna. For example, the signal after the part is replaced may result in a weaker signal outside the housing of the electronic device. In another example, the signal may result in a stronger signal outside the housing of the electronic device. In cases where the signal is stronger, the signal strength may, for example, exceed regulatory limits. Thus, in at least one implementation, it may be desirable to adjust the signal characteristics based at least in part on the material of the replacement part.

In some implementations, a method according to the present disclosure allows for the transmission of a test signal from a first antenna of the electronic device and receipt of the test signal at a second antenna to determine the housing material and adjust the transmission power of the antenna(e) accordingly.

Figure 1:
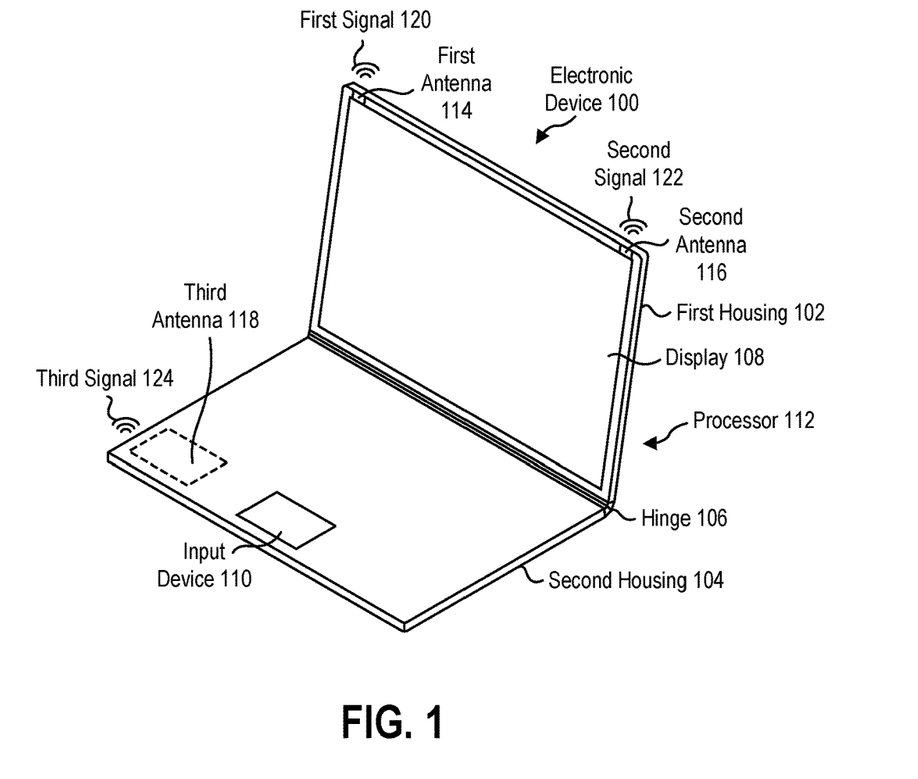
FIG. 1 is a perspective view of an electronic device.

FIG. 1 is a perspective view of an implementation of an electronic device 100. The electronic device 100 includes a first housing 102 and a second housing 104 movably connected to one another by a hinge 106. In some implementations, the first housing 102 of the electronic device 100 includes a display 108 to present visual information to a user and the second housing 104 of the electronic device 100 includes one or more input devices 110, such as a trackpad, a keyboard, etc., to allow a user to interact with the electronic device 100. In implementations in which the computing device is a hybrid computer, the first housing 102 includes the display 108 and at least a processor 112. In other implementations, a processor 112 is located in the second housing 104. The electronic device 100 further includes additional computer components, such as a storage device, system memory, a graphical processing unit, graphics memory, one or more antennae 114, 116, 118 (such as WIFI, BLUETOOTH, near-field communications, cellular), peripheral connection points, etc. In some implementations, the first housing 102 is removable from the hinge 106 and/or the second housing 104. In some implementations, the antennae 114, 116, 118 are coupled to communication circuitry that includes one or more transmitters, receivers, or transceivers.

The electronic components of an electronic device 100, in particular the display 108, input device 110, processor 112, memory, and batteries, occupy volume and add mass. In the example illustrated in FIG. 1 and in other examples, it is desirable that the electronic devices be thin and light for transport, while remaining powerful and efficient during use. The antennae 114, 116, 118, therefore, should be powerful and efficient while occupying as little volume of the electronic device 100 as possible.

While the implementation of an electronic device 100 illustrated in FIG. 1 is a hybrid laptop device with a plurality of housings 102, 104 that are selectively decouplable, it should be understood that the systems and methods according to the present disclosure are relevant to any electronic device 100 with any number of housings. In some implementations, an electronic device 100 is any computing device, such as a desktop computer, a tablet computer, a server, or a smartphone; a wearable device, such as a wrist- or head-mounted device; home appliances, such as cameras, televisions, radios, microwaves, or lights; home automation devices; automotive or other transportation devices; or any other electronic devices that communicate wirelessly using radio transmissions.

To increase repairability and/or customization of the electronic device 100 one or more components of the electronic device 100 (e.g., housings 102, 104) may be replaced. The replacement housing component may have a different housing material from the original housing material. For example, an electronic device 100 with a dented aluminum backplate of the first housing 102 could be repaired by replacing a portion of the first housing 102. However, when replacing the portion of the first housing 102 and changing the housing material to a material with a different transmission rate or other material property, the signal strength of a first signal 120 from the first antenna 116 passing through the housing material of the first housing 102 will change. Similarly, a second antenna 116 contained in the first housing 102 will also have a change in signal strength of a second signal 122. It should understood be that references in the present disclosure to replacement, repairs, or modifications to the housing can refer to a portion of the housing, a layer of the housing, the entire housing, or any instance where the housing material in the transmission path changes.

A third antenna 118 positioned in a different location in the electronic device 100 is not contained in the first housing 102, but rather in the second housing 104. Since the repair does not alter the housing material of the second housing 104, the signal strength of a third signal 124 remains unchanged.

In some implementations, test signals are transmitted by an antenna at a first location in the electronic device 100 and received at another antenna at a second location in the electronic device 100. The test signal is transmitted with a known signal power. In some examples, the test signal has a signal power of 20 decibel milliwatts (dBm). In other examples, the test signal has a signal power that is the maximum power allowed by the chipset. The test signal is received with a measured signal power that is compared to an expected signal power based on the location of the two antennae and the housing material in the transmission path. When a housing material is changed, either to repair the electronic device or to customize the electronic device 100, the measured signal power may deviate from the expected signal power for the known transmission power. The transmission power can be adjusted based on the measured signal power. For example, the transmission power may be increased or decreased from an initial transmission power.

In some implementations, a plurality of test signals are transmitted and received by different combinations of antennae in the electronic device to detect changes in different areas of the housing(s). For example, a change to the housing material of the first housing 102 affects a first test signal 120 that is transmitted from a first antenna 114 in the first housing 102 and received by a second antenna 116 also in the first housing 102. The effect on a first test signal 120 will be different when the first 120 test signal is received by the third antenna 118 in the second housing 104. A change in the housing material of the first housing 102 will affect a third test signal 124 from the third antenna 118 similarly when received at the first antenna 114 or the second antenna 116.

Figure 2:
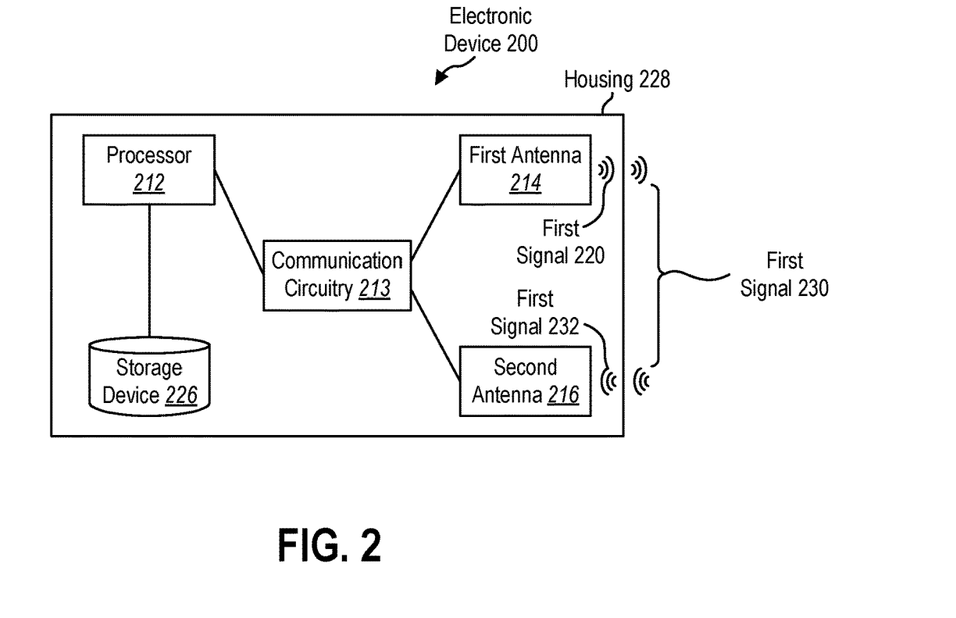
FIG. 2 is a schematic representation of an electronic device with a plurality of antennae.

FIG. 2 is a schematic representation of one implementation of an electronic device 200 that allows for adjustment of a transmission power of an antenna. In the illustrated implementation, the electronic device 200 includes a processor 212 in data communication with a hardware storage device 226 through communication circuitry 213. The hardware storage device 226 includes instructions stored thereon that, when executed by the processor 212, cause the processor 212 to perform one or more of the methods described herein. In other implementations, the processor 212 is in data communication with a remotely located hardware storage device 226, such as via a network.

In some implementations, the hardware storage device 226 is a solid-state storage medium. In some examples, the hardware storage device 226 is a volatile storage medium, such as dynamic random-access memory (DRAM). In other examples, the hardware storage device 226 is a non-volatile storage medium, such as electrically erasable programmable read-only memory or flash memory (NAND- or NOR-type). In other implementations, the hardware storage device 226 is a platen-based storage medium, such as a magnetic platen-based hard disk drive. In yet other implementations, the hardware storage device 226 is an optical storage medium, such as a compact disc, digital video disc, BLU-RAY disc, or other optical storage format.

The processor 212 is also in data communication with a first antenna 214 and a second antenna 216. The processor 212 sends information to the first antenna 214 and/or second antenna 216 to control the frequency, channel, band, transmission power, or combinations thereof of a first signal 220 of the first antenna 214. The first signal 220 is received at the second antenna 216.

The first antenna 214 and second antenna 216 are positioned in a housing 228. In some implementations, the electronic device has a single housing 228 and the antennae 214, 216 are positioned therein. In other implementations, the housing 228 of FIG. 2 is one of a plurality of housings of the electronic device 200. In yet other implementations, the first antenna 214 and second antenna 216 are positioned in different housings 228.

The first signal 220 is transmitted from the first antenna 214 through the housing 228 and is partially attenuated by the housing material of the housing 228. The partially attenuated first signal 230 passes through the housing 228 a second time, which further attenuates the first signal. The second antenna 216 receives the attenuated first signal 232 inside the housing 228 and measures a received signal power to calculate a measured attenuation of the first signal between the initial transmission signal power and the measured received signal power.

The transmission signal power, received signal power, measured attenuation, or combinations thereof are compared against data having material properties for a plurality of materials. In some implementations, the data comprises an array or table of material properties stored within the electronic device 200, the communication circuitry 213, or the storage device 226. In some implementations, the plurality of materials is a list of materials approved for use in electronic device housings. In some examples, the plurality of materials includes one or more of steel alloys, aluminum alloys, magnesium alloys, titanium alloys, other metals or metal alloys, carbon fiber, fiberglass, polymers such as synthetic fibers and textiles, organic materials such as plant products (e.g., cotton or wood) or animal textiles (e.g., wool), or combinations thereof. In at least one example, the housing includes a first surface that is fabric and an opposing second surface that is a metal alloy.

Figure 3:
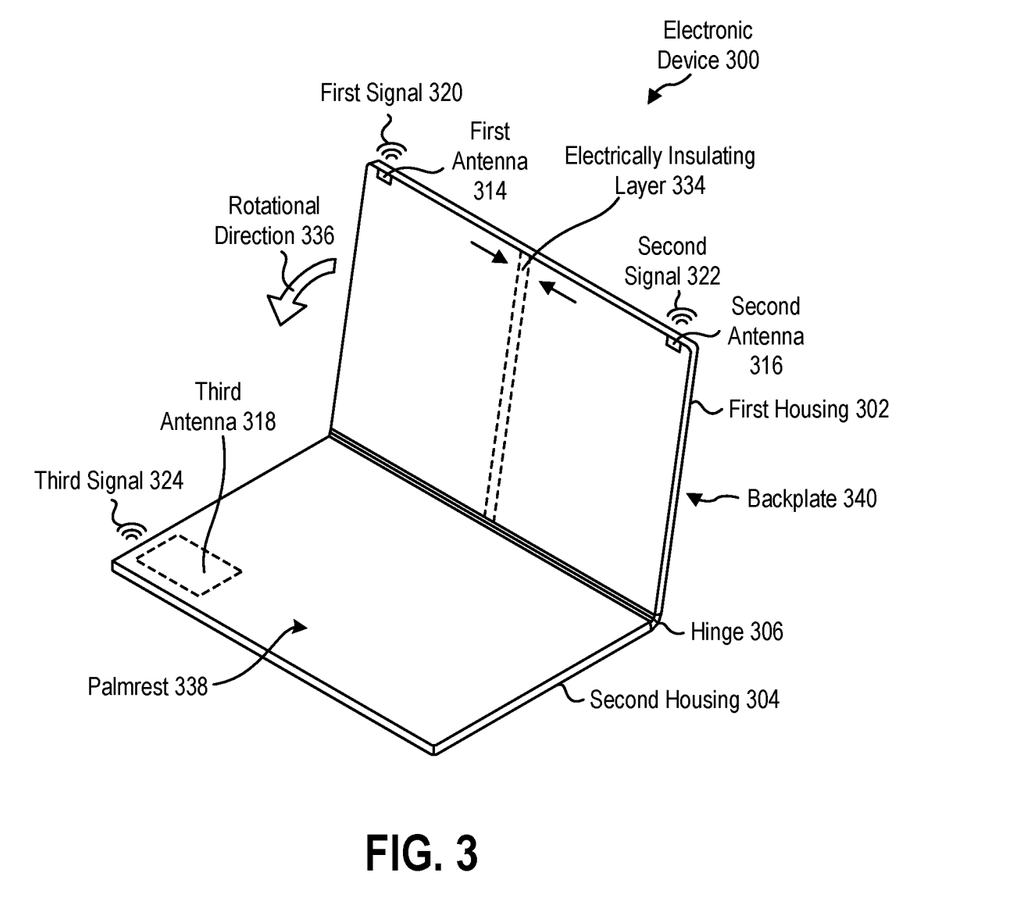
FIG. 3 is a perspective view of an electronic device transmitting and receiving test signals on a plurality of antennae.

FIG. 3 illustrates another implementation of an electronic device 300. The electronic device 300 may use a plurality of antennae 314, 316, 318 at different locations within the electronic device 300 to measure attenuation of signals 320, 322, 324 through different regions of the housing and different housing materials.

In some implementations, a first antenna 320 and a second antenna 316 are located in the same housing, such as the first housing 302 of FIG. 3, while a third antenna 328 is located in a second housing 304. Because the first housing 302 includes both the first antenna 314 and the second antenna 316 within the housing, an electrically insulating layer 334 is positioned in the first housing 302 directly between the first antenna 314 and second antenna 316. For example, an electrically insulating layer 334 is directly between two antennae when the electrically insulating layer 334 is positioned along and interrupting an axis drawn between the two antennae.

The electrically insulating layer 334 limits transmission of a first signal 320 to the second antenna 316 or a second signal 322 to the first antenna 314 through a transmission path within the first housing 302. By insulating the transmission path inside the first housing 302, any signals transmitted and received between the first antenna 314 and second antenna 316 are transmitted and received through the housing material. The electrically insulating layer 334 includes an insulating material such as a ceramic, an insulating foam, metal alloys, or other materials.

In some implementations, an electronic device 300 transmits and receives a test signal each direction between the two antennae. For example, the first antenna 314 transmits a first signal 320 that is received by the second antenna 316, and the second antenna 316 sends a second signal 322 that is received by the first antenna 314. This process can be repeated to test measured attenuation on a variety of frequencies, bands, channels, etc.

In other implementations, the electronic device 300 transmits and receives a test signal each direction between more than two antennae. In some examples, the first antenna 314 transmits a first signal 320 that is received by the second antenna 316, and the second antenna 316 sends a second signal 322 that is received by a third antenna 318, and the third antenna 318 transmits a third signal 324 that is received by the first antenna 314. This process can be repeated to test measured attenuation on a variety of frequencies, bands, channels, etc.

In other examples, the first antenna 314 transmits a first signal 320 through the first housing 302 that is received by both the second antenna 316 in the first housing 302 and the third antenna 318 in the second housing 304. While transmitting between the first antenna 314 and third antenna 318 will ensure the first signal passes through both the first housing 302 (and first housing material) and the second housing 304 (and second housing material), the position of the first antenna 314 relative to the third antenna 318 changes as the housings move in a rotational direction 336 around the hinge 306. In some examples, a sensor in the hinge 306 provides information to a processor (such as the processor 212 described in relation to FIG. 2) related to the position of the hinge 306 and the relative position of the first housing 302 and second housing 304.

By transmitting from an antenna at a known transmission power and receiving on one or more other antennae, the electronic device 300 can further determine which component of the first housing 302 and/or second housing 304 has changed. For example, a repair including changing a palmrest 338 of the second housing 304 from an aluminum alloy housing material to a synthetic fabric housing material will change a measured signal power between the first antenna 314 and the third antenna 318 while the measured signal power between the first antenna 314 and second antenna 316 remains substantially constant. In another example, a repair including changing a backplate 340 of the first housing 302 from a magnesium alloy housing material to a wood product housing material will change a measured signal power between the first antenna 314 and the second antenna 316 while the measured signal power between the first antenna 314 and third antenna 318 remains substantially constant.

In another implementation, only the first antenna 314 and third antenna 318 send and receive signals on the same channels. The measured changes in housing material measured by a first signal 320 and/or third signal 324 between the first antenna 314 and third antenna 318 can be used to adjust the transmission power of the second antenna 316. For example, a change in the measured signal power at the first antenna 314 can indicate at least a portion of the first housing 302 has changed. An adjustment to the transmission power of the first antenna 314 is, therefore, applicable to the second antenna 316, as well.

Figure 4:
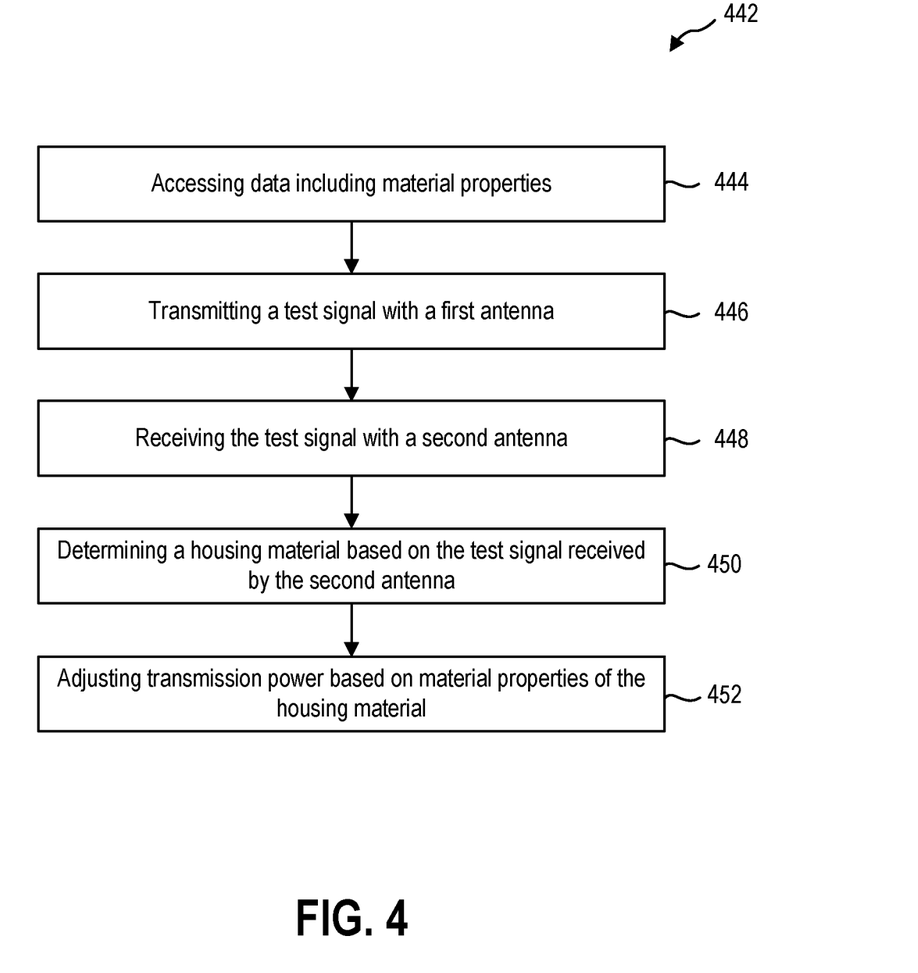
FIG. 4 is a flowchart illustrating a method of controlling transmission power in an electronic device.

FIG. 4 is a flowchart illustrating a method 442 of controlling transmission power in an electronic device. The method includes accessing data including material properties of a plurality of materials at 444. Accessing data may include accessing a hardware storage device. In some implementations, the hardware storage device is a local device that is in or in electrical communication with the electronic device. In other implementations, a processor is in data communication with a remotely located hardware storage device such as via a network (e.g., a cloud-based storage device).

In some implementations, the hardware storage device is a solid-state storage medium. In some examples, the hardware storage device is a volatile storage medium, such as dynamic random-access memory (DRAM). In other examples, the hardware storage device is a non-volatile storage medium, such as electrically erasable programmable read-only memory or flash memory (NAND- or NOR-type). In other implementations, the hardware storage device is a platen-based storage medium, such as a magnetic platen-based hard disk drive. In yet other implementations, the hardware storage device is an optical storage medium, such as a compact disc, digital video disc, BLURAY disc, or other optical storage format.

Example data tables are illustrated below:

TABLE 1

| Frequency (MHz) | Tx Power | Loss (Mat. #1) | Loss (Mat. #2) |
| --- | --- | --- | --- |
| 2414 | 20 dBm | 25 dBm | 27 dBm |
| 2417 | 20 dBm | 25.5 dBm | 28 dBm |
| 2422 | 20 dBm | 22 dBm | 24 dBm |
| ... | ... | ... | ... |
| 2462 | 20 dBm | 19 dBm | 20 dBm |

TABLE 2

| Frequency (MHz) | Tx Power | Loss (Mat. #1) | Loss (Mat. #2) |
| --- | --- | --- | --- |
| 5035 | 20 dBm | 26 dBm | 23 dBm |
| 5040 | 20 dBm | 27 dBm | 24 dBm |
| 5045 | 20 dBm | 25 dBm | 25 dBm |
| ... | ... | ... | ... |
| 5825 | 20 dBm | 20 dBm | 24 dBm |

The method 442 further includes transmitting a test signal with a first antenna at 446 and receiving the test signal with a second antenna at 448. The first antenna and second antenna are radio antenna. For example, the first antenna and second antenna are each one of a Wi-Fi antenna, near-field communication, cellular antenna, BLUETOOTH antenna, or other radio antenna. The first antenna and second antenna transmit and receive on the same band. The first antenna and second antenna are positioned at different locations in the electronic device. In some examples, the first antenna and second antenna are in different locations in the same housing. In other examples, the first antenna and second antenna are in separate housings. In yet other examples, the first antenna and second antenna are movable relative to one another, and the electronic device has at least one sensor to determine a distance between the first antenna and second antenna.

In some implementations, transmitting and receiving a test signal occurs during a startup procedure of the electronic device. In some examples, transmitting and receiving the test signal occurs when booting the electronic device from an unpowered state. In other examples, transmitting and receiving the test signal occurs when wake the device from a standby state. In other implementations, transmitting and receiving the test signal occurs during a transmission initialization procedure. For example, an electronic device is powered on and operational, and the antenna(e) are held in a standby state. In another example, transmitting and receiving a test signal occurs each time a new network connect is completed. In yet other examples, transmitting and receiving a test signal occurs upon receipt of a user input to expressly begin the detection of housing material and adjustment of transmission power. In further examples, transmitting and receiving a test signal occurs when an established wireless data connection is unexpectedly terminated. An unexpected termination occurs when the established wireless data connection terminates without the electronic device initiating the termination.

The method 442 includes determining a housing material based on the test signal received by the second antenna at 450. For example, the data tables allow the processor to correlate a measured attenuation (Loss) of a received signal power based on a known transmission power (Tx Power) to a known and/or approved housing material. Specifically, a 20 dBm transmission from a first antenna on a first channel (2414 MHz) that is received at a second antenna with a measured received power of −5 dBm provides a loss of 25 dBm and indicates the housing material is Material #1. A 20 dBm transmission from a first antenna on the first channel that is received at a second antenna with a measured received power of −7 dBm provides a loss of 27 dBm and indicates the housing material is Material #2. In other examples, a 20 dBm transmission from a first antenna on the first channel that is received at a second antenna with a measured attenuation of 24 dBm would indicate that the housing material is not included in the table of known and/or approved materials. Additionally, the 24 dBm loss can be an erroneous measurement, for which the electronic device transmits an additional test signal on another frequency, such as 2417 MHz, 2422 MHz, 2462 MHz, or any other frequency in the data table.

The data table can have a different number of frequencies depending on the band. For example, Table #1 includes 11 frequencies. In Table #2, transmission power and loss for Material #1 and Material #2 are stored for over 100 frequencies. In some implementations, a data table includes both material transmission properties and the transmission properties for combinations of known and/or approved material. For example, a data table including transmission properties for aluminum alloy and leather housing materials also includes transmission properties for leather layered over aluminum alloy.

In some implementations, the processor prioritizes frequencies on which to transmit test signals based upon a difference between the expected received power of the materials in the data table. For example, the processor calculates the differences between the expected power loss values of Material #1 and Material #2, and the processor then instructs the first antenna to transmit on a second channel, as the 2.5 dBm difference provides the greatest likelihood of differentiating between the two materials. In other examples, the processor tests each frequency in numerical order, a random order, or previously successful order, until a material is identified. The test channels can be any channels on which the first antenna and second antenna can transmit and receive. In some examples, a material is identified if the measured attenuation (i.e., signal power loss) is within 0.5 dBm of the expected attenuation.

The attenuation of the transmitted signal changes relative to the component of the housing that has changed. In some implementations, the data table is specific to a component of the housing, and a change in the housing is identified prior to accessing the data for that component of the housing. For example, an initial test signal is provided between a plurality of antenna to identify a change in a component of the housing. In another example, a sensor on the chassis of the electronic device identifies and records a change in the housing. In yet another example, a user input provides information to the processor regarding the changed component. In further examples, a hardware and/or software handshake between components provides information to the processor regarding the changed component.

The method 442 also includes adjusting a transmission power based on the material properties of the housing material at 452. After determining the housing material, the processor or communication circuitry adjusts the transmission power of the first antenna and/or the second antenna (e.g., by adjusting operation of a corresponding transmitter or transceiver) to increase wireless communication performance (e.g., by increasing the transmission power) or to ensure regulatory compliance (e.g., by lowering transmission power to 20 dBm or less for IEEE 802.11b/g wireless LAN 20 MHz-wide channels in the 2.4 GHz Wi-Fi/ISM band).

Figure 5:
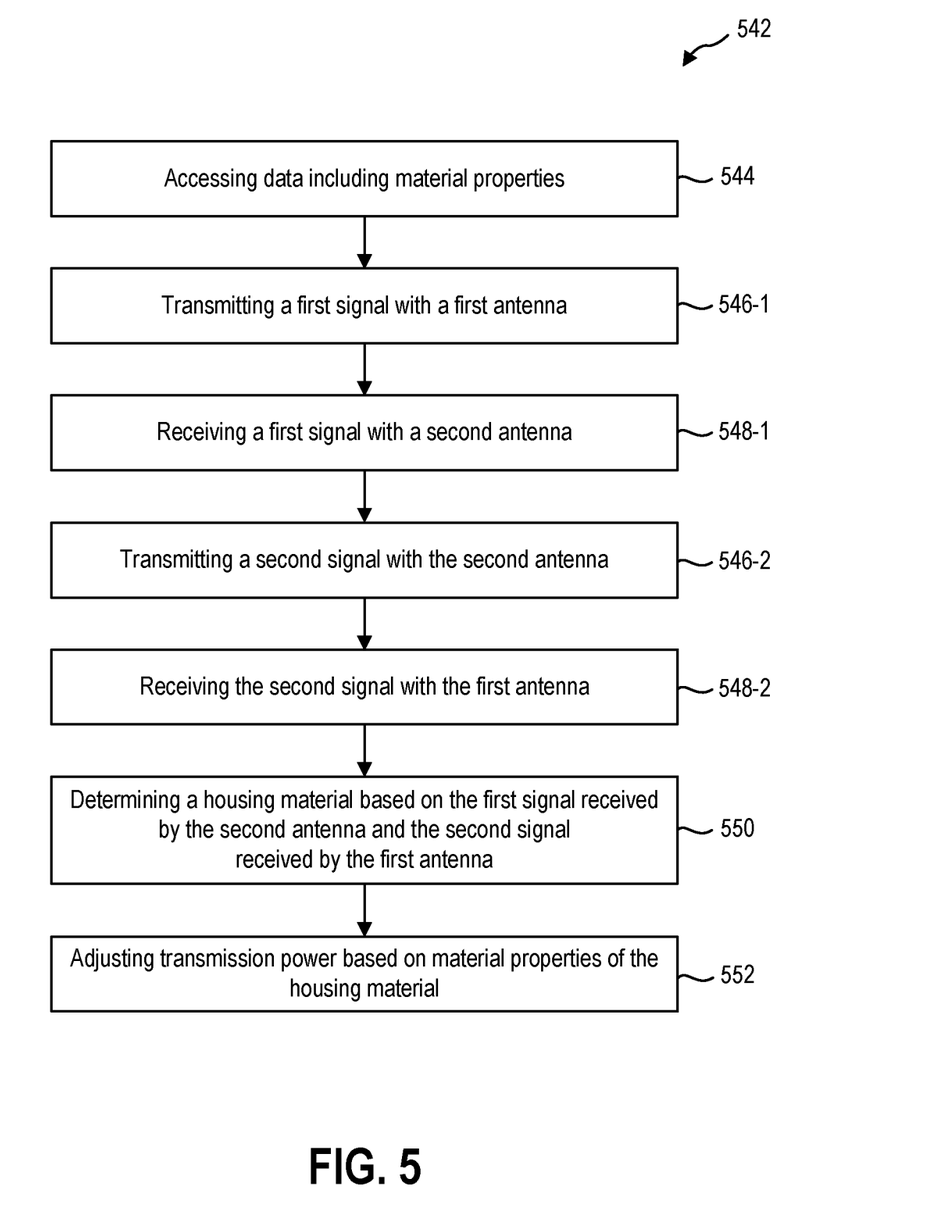
FIG. 5 is a flowchart illustrating another method of controlling transmission power in an electronic device.

FIG. 5 is a flowchart illustrating another implementation of a method 542 of controlling a transmission power in an electronic device. The method 542 includes accessing data including material properties of a plurality of materials at 544. In some implementations, the data is the same as or similar to that described in relation to FIG. 4. In other implementations, the data includes different transmission and received power information for different directions of transmission. In some examples, the first antenna and second antenna of the electronic device are directional antenna. In at least one example, due to the orientation of the first antenna relative to the second antenna, a first signal from the first antenna is received by the second antenna with a greater signal power than a second signal from the second antenna that is received at the first antenna. In such examples, a data table may provide expected received power data for each direction of transmission between the antenna for each housing material.

In other examples, a difference in transmission loss based upon the direction of transmission is used to select a primary antenna and an auxiliary antenna. If the first antenna provides a stronger first signal received at the second antenna than a second signal transmitted from the second antenna to the first antenna, the first antenna is selected as a primary antenna for wireless communications for the electronic device.

The method 542 further includes transmitting a first signal with a first antenna at 546-1 and receiving the first signal with a second antenna at 548-1. After transmitting and receive the first signal, the method 542 includes transmitting a second signal with the second antenna at 546-2 and receiving the second signal with the first antenna at 548-2.

The electronic device then determines the housing material based on at least one of the first signal received by the second antenna and the second signal received by the first antenna at 550. In some implementations, determining the housing material includes identifying the housing material from the accessed data based upon the first signal transmission power and received power. In other implementations, determining the housing material includes identifying the housing material from the accessed data based upon the second signal transmission power and received power. In yet other implementations, determining the housing material includes identifying the housing material from the accessed data based upon both the first signal transmission power and received power and the second signal transmission power and received power. The method 542 also includes adjusting a transmission power based on the material properties of the housing material at 552.

Figure 6:
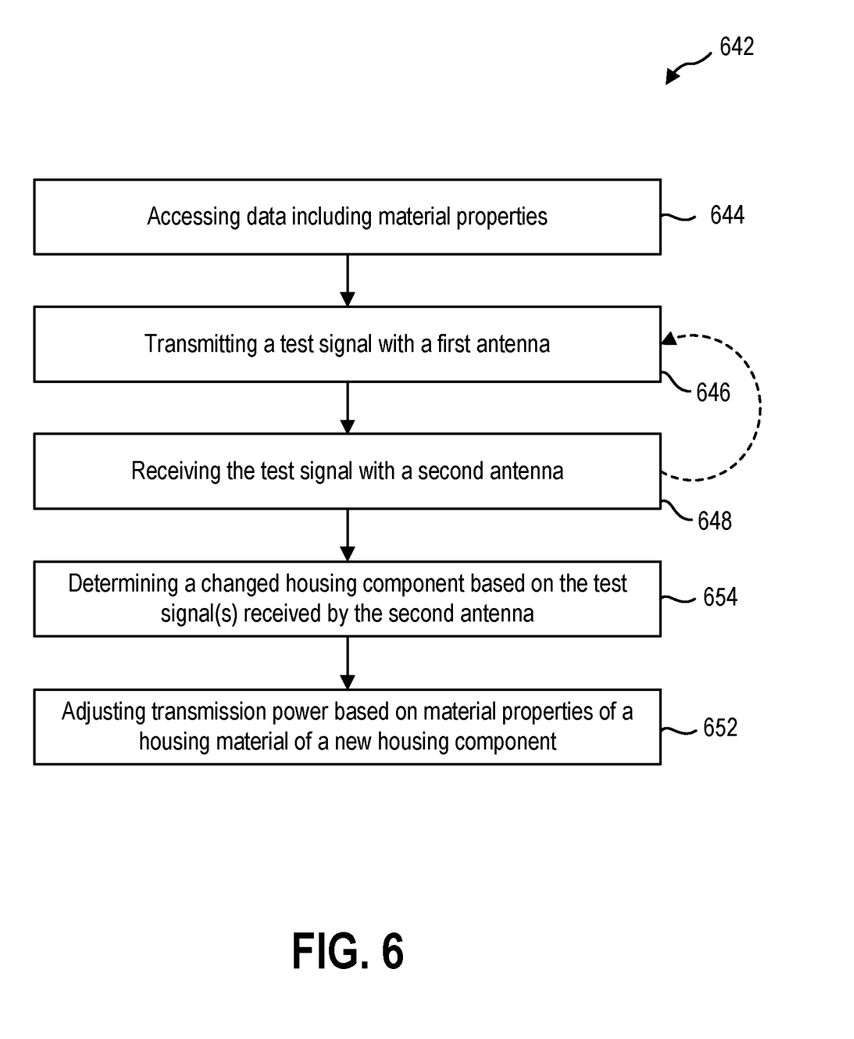
FIG. 6 is a flowchart illustrating a method of controlling transmission power in an electronic device with a portion of the housing changed.

FIG. 6 is a flowchart illustrating an implementation of a method 642 of identifying a change in housing material and controlling a transmission power in an electronic device. The method 642 includes accessing data including material properties of a plurality of materials at 644. In some implementations, the data is the same as or similar to that described in relation to FIG. 4 or FIG. 5.

The method 642 further includes transmitting a first signal with a first antenna at 646 and receiving the first signal with a second antenna at 648. In some implementations, a second test signal can be transmitted and received by different antenna or on a different channel. By transmitting the second test signal from a different antenna and/or receiving the second test signal on a different antenna than the first test signal, the electronic device can measure changes in housing material that affect all or only a portion of the transmission paths.

The method includes determining the changed housing component based on the plurality of test signals at 654 by comparing the differences in path loss based upon the different transmission paths between antenna pairs, such as described in relation to FIG. 3. The method 642 further includes adjusting the transmission power of one or more of the plurality of antennae based on the material properties of the changed housing component at 652. As described in relation to FIG. 3, changing only one component of a housing (or changing one housing of a plurality of housings of the electronic device) affects the transmission power of the antenna differently depending on location. Therefore, determining that only a portion of the housing (or one housing of the plurality of housings) has changed can allow the adjustment to apply only to select antennae based on location within the electronic device.

Figure 7:
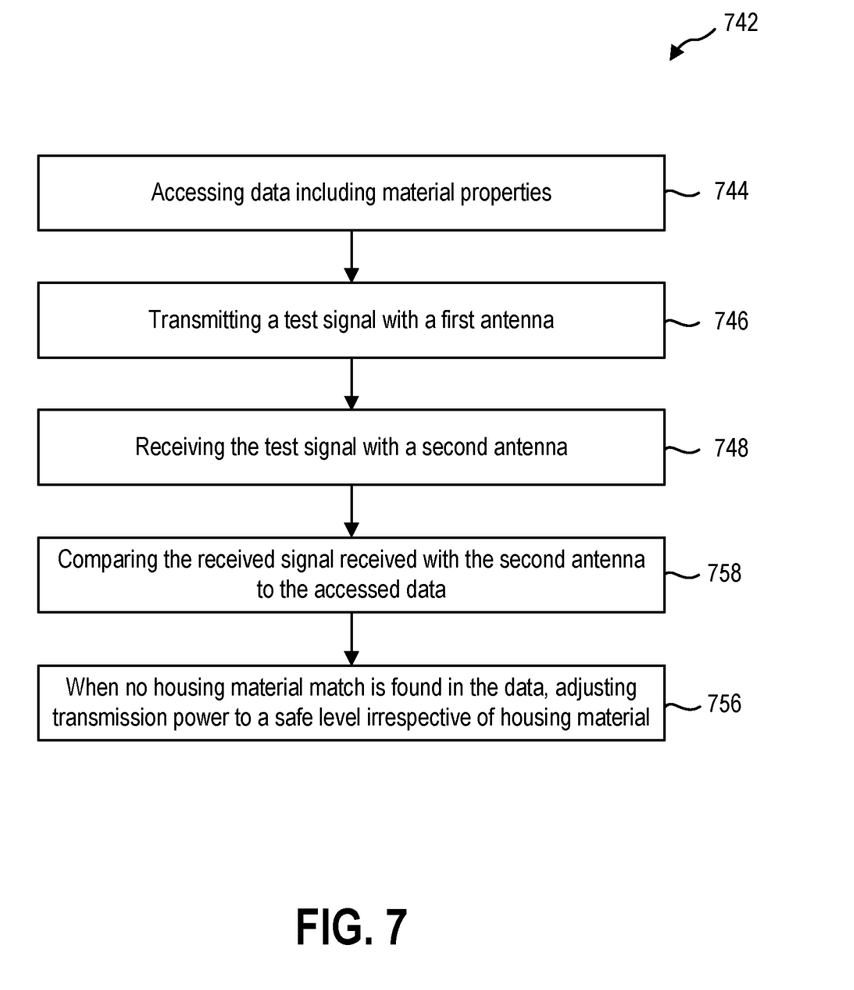
FIG. 7 is a flowchart illustrating a method of controlling transmission power in an electronic device with an unknown housing material.

In some implementations, the measured received power of the test signals does not match any known and/or approved housing material in the data table. FIG. 7 illustrates an implementation of a method 742 of controlling a transmission power when an unknown housing material is used. The method 742 includes accessing data including material properties of a plurality of materials at 744. In some implementations, the data is the same as or similar to that described in relation to FIG. 4 or FIG. 5.

The method 742 further includes transmitting a test signal with a first antenna at 746 and receiving the test signal with a second antenna at 748. The method 742 includes comparing the received test signal to the data table. In some implementations, no housing material match is found in the data table. For example, the measured received signal does not match the expected power level of any known and/or approved material. In such instances, the method 742 includes adjusting the transmission power to a power level that is safe for use, irrespective of the housing material. In a particular example, the transmission power is adjusted to a power level that is safe for use when the antenna is not inside any housing, such as if the backplate of an electronic device is removed. In some implementations, the safe power level is the maximum power level allowed by local regulations for the device and/or band. In other implementations, the safe power level is the lowest transmission power level for all approved and/or known materials on the data table.

INDUSTRIAL APPLICABILITY

This disclosure generally relates to systems and methods of adjusting the transmission power of an antenna in an electronic device to compensate for changes in housing material. An electronic device includes one or more housings around one or more antenna(e). In some implementations, an electronic device includes a first housing, such as a tablet device housing. In other implementations, an electronic device includes a first housing and a second housing. In implementations in which the electronic device is a hybrid computer, the first housing includes the display and at least a processor. In other implementations, a processor is located in the second housing. The electronic device further includes additional computer components, such as a storage device, system memory, a graphical processing unit, graphics memory, one or more antennae (such as Wi-Fi, BLUETOOTH, near-field communications, cellular), peripheral connection points, etc. In some implementations, the first housing is removable from the hinge and/or the second housing. In some implementations, the antennae are coupled to communication circuitry that includes one or more transmitters, receivers, or transceivers.

The electronic components of an electronic device, in particular the display, input device, processor, memory, and batteries, occupy volume and add mass. In some examples, it is desirable that the electronic devices be thin and light for transport, while remaining powerful and efficient during use. The antennae, therefore, should be powerful and efficient while occupying as little volume of the electronic device as possible.

It should be understood that the systems and methods according to the present disclosure are relevant to any electronic device with any number of housings. In some implementations, an electronic device is any computing device, such as a desktop computer, a tablet computer, a server, or a smartphone; a wearable device, such as a wrist- or head-mounted device; home appliances, such as cameras, televisions, radios, microwaves, or lights; home automation devices; automotive or other transportation devices; or any other electronic devices that communicate wirelessly using radio transmissions.

To increase repairability and/or customization of the electronic device one or more components of the electronic device (e.g., housings) may be replaced. The replacement housing component may have a different housing material from the original housing material. For example, an electronic device with a dented aluminum backplate of the first housing could be repaired by replacing a portion of the first housing. However, when replacing the portion of the first housing and changing the housing material to a material with a different transmission rate or other material property, the signal strength of a first signal from the first antenna passing through the housing material of the first housing will change. Similarly, a second antenna contained in the first housing will also have a change in signal strength of a second signal. It should be understood that references in the present disclosure to replacement, repairs, or modifications to the housing can refer to a portion of the housing, a layer of the housing, the entire housing, or any instance where the housing material in the transmission path changes.

A third antenna positioned in a different location in the electronic device is not contained in the first housing, but rather in the second housing. Since the repair does not alter the housing material of the second housing, the signal strength of a third signal remains unchanged.

In some implementations, test signals are transmitted by an antenna at a first location in the electronic device and received at another antenna at a second location in the electronic device. The test signal is transmitted with a known signal power. In some examples, the test signal has a signal power of 20 decibel milliwatts (dBm). In other examples, the test signal has a signal power that is the maximum power allowed by the chipset. The test signal is received with a measured signal power that is compared to an expected signal power based on the location of the two antennae and the housing material in the transmission path. When a housing material is changed, either to repair the electronic device or to customize the electronic device, the measured signal power may deviate from the expected signal power for the known transmission power. The transmission power can be adjusted based on the measured signal power. For example, the transmission power may be increased or decreased from an initial transmission power.

In some implementations, a plurality of test signals is transmitted and received by different combinations of antennae in the electronic device to detect changes in different areas of the housing(s). For example, a change to the housing material of the first housing affects a first test signal that is transmitted from a first antenna in the first housing and received by a second antenna also in the first housing. The effect on a first test signal will be different when the first test signal is received by the third antenna in the second housing. A change in the housing material of the first housing will affect a third test signal from the third antenna similarly when received at the first antenna or the second antenna.

In some implementations, the electronic device includes a processor in data communication with a hardware storage device through communication circuitry. The hardware storage device includes instructions stored thereon that, when executed by the processor, cause the processor to perform one or more of the methods described herein. In other implementations, the processor is in data communication with a remotely located hardware storage device, such as via a network.

In some implementations, the hardware storage device is a solid-state storage medium. In some examples, the hardware storage device is a volatile storage medium, such as dynamic random-access memory (DRAM). In other examples, the hardware storage device is a non-volatile storage medium, such as electrically erasable programmable read-only memory or flash memory (NAND- or NOR-type).

In other implementations, the hardware storage device is a platen-based storage medium, such as a magnetic platen-based hard disk drive. In yet other implementations, the hardware storage device is an optical storage medium, such as a compact disc, digital video disc, BLURAY disc, or other optical storage format.

The processor is also in data communication with a first antenna and a second antenna. The processor sends information to the first antenna and/or second antenna to control the frequency, channel, band, transmission power, or combinations thereof of a first signal of the first antenna. The first signal is received at the second antenna.

The first antenna and second antenna are positioned in a housing. In some implementations, the electronic device has a single housing and the antennae are positioned therein. In other implementations, the housing is one of a plurality of housings of the electronic device. In yet other implementations, the first antenna and second antenna are positioned in different housings.

The first signal is transmitted from the first antenna through the housing and is partially attenuated by the housing material of the housing. The partially attenuated first signal passes through the housing a second time, which further attenuates the first signal. The second antenna receives the attenuated first signal inside the housing and measures a received signal power to calculate a measured attenuation of the first signal.

The transmission signal power, received signal power, measured attenuation, or combinations thereof are compared against data having material properties for a plurality of materials. In some implementations, the data comprises an array or table of material properties stored within the electronic device 200, the communication circuitry 213, or the storage device 226. In some implementations, the plurality of materials is a list of materials approved for use in electronic device housings. In some examples, the plurality of materials includes one or more of steel alloys, aluminum alloys, magnesium alloys, titanium alloys, other metals or metal alloys, carbon fiber, fiberglass, polymers such as synthetic fibers and textiles, organic materials such as plant products (e.g., cotton or wood) or animal textiles (e.g., wool), or combinations thereof. In at least one example, the housing includes a first surface that is fabric and an opposing second surface that is a metal alloy.

In some implementations, the electronic device uses a plurality of antennae at different locations within the electronic device to measure attenuation of signals through different regions of the housing and different housing materials.

In some implementations, a first antenna and a second antenna are located in the same housing, such as the first housing, while a third antenna is located in a second housing. Because the first housing includes both the first antenna and the second antenna within the housing, an electrically insulating layer is positioned in the first housing directly between the first antenna and second antenna. For example, an electrically insulating layer is directly between two antennae when the electrically insulating layer is positioned along and interrupting an axis drawn between the two antennae.

The electrically insulating layer limits transmission of a first signal to the second antenna or a second signal to the first antenna through a transmission path within the first housing. By insulating the transmission path inside the first housing, any signals transmitted and received between the first antenna and second antenna are transmitted and received through the housing material. The electrically insulating layer includes an insulating material such as a ceramic, an insulating foam, metal alloys, or other materials.

In some implementations, an electronic device transmits and receives a test signal each direction between the two antennae. For example, the first antenna transmits a first signal that is received by the second antenna, and the second antenna sends a second signal that is received by the first antenna. This process can be repeated to test measured attenuation on a variety of frequencies, bands, channels, etc.

In other implementations, the electronic device transmits and receives a test signal each direction between more than two antennae. In some examples, the first antenna transmits a first signal that is received by the second antenna, and the second antenna sends a second signal that is received by a third antenna, and the third antenna transmits a third signal that is received by the first antenna. This process can be repeated to test measured attenuation on a variety of frequencies, bands, channels, etc.

In other examples, the first antenna transmits a first signal through the first housing that is received by both the second antenna in the first housing and the third antenna in the second housing. While transmitting between the first antenna and third antenna will ensure the first signal passes through both the first housing (and first housing material) and the second housing (and second housing material), the position of the first antenna relative to the third antenna changes as the housings move in a rotational direction around the hinge. In some examples, a sensor in the hinge provides information to a processor related to the position of the hinge and the relative position of the first housing and second housing.

By transmitting from an antenna at a known transmission power and receiving on one or more other antennae, the electronic device can further determine which component of the first housing and/or second housing has changed. For example, a repair including changing a palmrest of the second housing from an aluminum alloy housing material to a synthetic fabric housing material will change a measured signal power between the first antenna and the third antenna while the measured signal power between the first antenna and second antenna remains substantially constant. In another example, a repair including changing a backplate of the first housing from a magnesium alloy housing material to a wood product housing material will change a measured signal power between the first antenna and the second antenna while the measured signal power between the first antenna and third antenna remains substantially constant.

In another implementation, only the first antenna and third antenna send and receive signals on the same channels. The measured changes in housing material measured by a first signal and/or third signal between the first antenna and third antenna can be used to adjust the transmission power of the second antenna. For example, a change in the measured signal power at the first antenna can indicate at least a portion of the first housing has changed. An adjustment to the transmission power of the first antenna is, therefore, applicable to the second antenna, as well.

In some implementations, a method of controlling transmission power in an electronic device includes accessing data including material properties of a plurality of materials. Accessing data may include accessing a hardware storage device. In some implementations, the hardware storage device is a local device that is in or in electrical communication with the electronic device. In other implementations, a processor is in data communication with a remotely located hardware storage device such as via a network (e.g., a cloud-based storage device).

In some implementations, the hardware storage device is a solid-state storage medium. In some examples, the hardware storage device is a volatile storage medium, such as dynamic random-access memory (DRAM). In other examples, the hardware storage device is a non-volatile storage medium, such as electrically erasable programmable read-only memory or flash memory (NAND- or NOR-type). In other implementations, the hardware storage device is a platen-based storage medium, such as a magnetic platen-based hard disk drive. In yet other implementations, the hardware storage device is an optical storage medium, such as a compact disc, digital video disc, BLURAY disc, or other optical storage format.

Example data tables are illustrated below:

TABLE 1

| Channel | Tx Power | Rx Power (Mat. #1) | Rx Power (Mat. #2) |
|---------|----------|--------------------|--------------------|
| 1       | 20 dBm   | −5 dBm             | −7 dBm             |
| 2       | 20 dBm   | −5.5 dBm           | −8 dBm             |
| 3       | 20 dBm   | −2 dBm             | −4 dBm             |
| ...     | ...      | ...                | ...                |
| 24      | 20 dBm   | +1 dBm             | 0 dBm              |

TABLE 2

| Channel | Tx Power | Rx Power (Mat. #1) | Rx Power (Mat. #2) |
|---------|----------|--------------------|--------------------|
| 1       | 20 dBm   | −6 dBm             | −3 dBm             |
| 2       | 20 dBm   | −7 dBm             | −4 dBm             |
| 3       | 20 dBm   | −5 dBm             | −5 dBm             |
| ...     | ...      | ...                | ...                |
| 100     | 20 dBm   | 0 dBm              | −4 dBm             |

The method further includes transmitting a test signal with a first antenna and receiving the test signal with a second antenna. The first antenna and second antenna are radio antenna. For example, the first antenna and second antenna are each one of a Wi-Fi antenna, near-field communication, cellular antenna, BLUETOOTH antenna, or other radio antenna. The first antenna and second antenna transmit and receive on the same band. The first antenna and second antenna are positioned at different locations in the electronic device. In some examples, the first antenna and second antenna are in different locations in the same housing. In other examples, the first antenna and second antenna are in separate housings. In yet other examples, the first antenna and second antenna are movable relative to one another, and the electronic device has at least one sensor to determine a distance between the first antenna and second antenna.

In some implementations, transmitting and receiving a test signal occurs during a startup procedure of the electronic device. In some examples, transmitting and receiving the test signal occurs when booting the electronic device from an unpowered state. In other examples, transmitting and receiving the test signal occurs when wake the device from a standby state. In other implementations, transmitting and receiving the test signal occurs during a transmission initialization procedure. For example, an electronic device is powered on and operational, and the antenna(e) are held in a standby state. In another example, transmitting and receiving a test signal occurs each time a new network connect is completed. In yet other implementations, transmitting and receiving a test signal occurs upon receipt of a user input to expressly begin the detection of housing material and adjustment of transmission power. In further examples, transmitting and receiving a test signal occurs when an established wireless data connection is unexpectedly terminated. An unexpected termination occurs when the established wireless data connection terminates without the electronic device initiating the termination.

The method includes determining a housing material based on the test signal received by the second antenna. For example, the data tables allow the processor to correlate a measured attenuation (Loss) of a received signal power based on a known transmission power (Tx Power) to a known and/or approved housing material. Specifically, a 20 dBm transmission from a first antenna on a first channel (2414 MHz) that is received at a second antenna with a measured received power of −5 dBm provides a loss of 25 dBm and indicates the housing material is Material #1. A 20 dBm transmission from a first antenna on the first channel that is received at a second antenna with a measured received power of −7 dBm provides a loss of 27 dBm and indicates the housing material is Material #2. In other examples, a 20 dBm transmission from a first antenna on the first channel that is received at a second antenna with a measured attenuation of 24 dBm would indicate that the housing material is not included in the table of known and/or approved materials. Additionally, the 24 dBm loss can be an erroneous measurement, for which the electronic device transmits an additional test signal on another frequency, such as 2417 MHz, 2422 MHz, 2462 MHz, or any other frequency in the data table.

The data table can have a different number of frequencies depending on the band. For example, Table #1 includes 11 frequencies. In Table #2, transmission power and loss for Material #1 and Material #2 are stored for over 100 frequencies. In some implementations, a data table includes both material transmission properties and the transmission properties for combinations of known and/or approved material. For example, a data table including transmission properties for aluminum alloy and leather housing materials also includes transmission properties for leather layered over aluminum alloy.

In some implementations, the processor prioritizes frequencies on which to transmit test signals based upon a difference between the expected received power of the materials in the data table. For example, the processor calculates the differences between the expected power loss values of Material #1 and Material #2, and the processor then instructs the first antenna to transmit on a second channel, as the 2.5 dBm difference provides the greatest likelihood of differentiating between the two materials. In other examples, the processor tests each frequency in numerical order, a random order, or previously successful order, until a material is identified. The test channels can be any channels on which the first antenna and second antenna can transmit and receive. In some examples, a material is identified if the measured attenuation (i.e., signal power loss) is within 0.5 dBm of the expected attenuation.

The attenuation of the transmitted signal changes relative to the component of the housing that has changed. In some implementations, the data table is specific to a component of the housing, and a change in the housing is identified prior to accessing the data for that component of the housing. For example, an initial test signal is provided between a plurality of antenna to identify a change in a component of the housing. In another example, a sensor on the chassis of the electronic device identifies and records a change in the housing. In yet another example, a user input provides information to the processor regarding the changed component. In further examples, a hardware and/or software handshake between components provides information to the processor regarding the changed component.

The method also includes adjusting a transmission power based on the material properties of the housing material. After determining the housing material, the processor or communication circuitry adjusts the transmission power of the first antenna and/or the second antenna (e.g., by adjusting operation of a corresponding transmitter or transceiver) to increase wireless communication performance (e.g., by increasing the transmission power) or to ensure regulatory compliance (e.g., by lowering transmission power to 20 dBm or less for IEEE 802.11b/g wireless LAN 20 MHz-wide channels in the 2.4 GHz Wi-Fi/ISM band).

In other implementations, a method of controlling a transmission power in an electronic device includes accessing data including material properties of a plurality of materials. In some implementations, the data is the same as or similar to that described above. In other implementations, the data includes different transmission and received power information for different directions of transmission. In some examples, the first antenna and second antenna of the electronic device are directional antenna. In at least one example, due to the orientation of the first antenna relative to the second antenna, a first signal from the first antenna is received by the second antenna with a greater signal power than a second signal from the second antenna that is received at the first antenna. In such examples, a data table may provide expected received power data for each direction of transmission between the antenna for each housing material.

In other examples, a difference in transmission loss based upon the direction of transmission is used to select a primary antenna and an auxiliary antenna. If the first antenna provides a stronger first signal received at the second antenna than a second signal transmitted from the second antenna to the first antenna, the first antenna is selected as a primary antenna for wireless communications for the electronic device.

The method further includes transmitting a first signal with a first antenna and receiving the first signal with a second antenna. After transmitting and receive the first signal, the method includes transmitting a second signal with the second antenna and receiving the second signal with the first antenna.

The electronic device then determines the housing material based on at least one of the first signal received by the second antenna and the second signal received by the first antenna. In some implementations, determining the housing material includes identifying the housing material from the accessed data based upon the first signal transmission power and received power. In other implementations, determining the housing material includes identifying the housing material from the accessed data based upon the second signal transmission power and received power. In yet other implementations, determining the housing material includes identifying the housing material from the accessed data based upon both the first signal transmission power and received power and the second signal transmission power and received power. The method also includes adjusting a transmission power based on the material properties of the housing material.

In some implementations, a method of identifying a change in housing material and controlling a transmission power in an electronic device includes accessing data including material properties of a plurality of materials.

The method further includes transmitting a first signal with a first antenna and receiving the first signal with a second antenna. In some implementations, a second test signal can be transmitted and received by different antenna or on a different channel. By transmitting the second test signal from a different antenna and/or receiving the second test signal on a different antenna than the first test signal, the electronic device can measure changes in housing material that affect all or only a portion of the transmission paths.

The method includes determining the changed housing component based on the plurality of test signals by comparing the measured attenuation based upon the different transmission paths between antenna pairs. The method further includes adjusting the transmission power of one or more of the plurality of antennae based on the material properties of the changed housing component. As described above, changing only one component of a housing (or changing one housing of a plurality of housings of the electronic device) affects the transmission power of the antenna differently depending on location. Therefore, determining that only a portion of the housing (or one housing of the plurality of housings) has changed can allow the adjustment to apply only to select antennae based on location within the electronic device.

In some implementations, the measured received power of the test signals does not match any known and/or approved housing material in the data table. In such instances, a method of controlling a transmission power when an unknown housing material is used. The method includes accessing data including material properties of a plurality of materials.

The method further includes transmitting a test signal with a first antenna and receiving the test signal with a second antenna. The method includes comparing the received test signal to the data table. In some implementations, no housing material match is found in the data table. For example, the measured received signal does not match the expected power level of any known and/or approved material. In such instances, the method includes adjusting the transmission power to a power level that is safe for use, irrespective of the housing material. In a particular example, the transmission power is adjusted to a power level that is safe for use when the antenna is not inside any housing, such as if the backplate of an electronic device is removed. In some implementations, the safe power level is the maximum power level allowed by local regulations for the device and/or band. In other implementations, the safe power level is the lowest transmission power level for all approved and/or known materials on the data table.

In at least some implementations, a system and/or method according to the present disclosure allows an electronic device to have one or more components of the device replaced or removed without adversely impacting the wireless communication performance, safety, or regulatory compliance. For example, a laptop may have a palmrest replaced with a different material or a tablet device may have a dented backplate repaired with a new backplate. The electronic device can measure a change in the effective signal power and adjust the transmission power of at least one antenna to compensate for the change.

The present disclosure relates to system and methods for adjusting a transmission power of an antenna according to at least the examples provided in the sections below:

Section 1. A method for controlling wireless communication performance in an electronic device, the method including:

accessing data containing material properties relating to a plurality of materials;

transmitting a first test signal on a first transmission channel with a first antenna at a first location in the electronic device;

receiving the first test signal on the first transmission channel with a second antenna at a second location in the electronic device;

determining a housing material of the electronic device based on a measured attenuation of the first test signal received by the second antenna based upon the data containing transmission properties relating to a plurality of materials; and adjusting a transmission power of one of the first antenna and the second antenna based upon the material properties of the housing material.

Section 2. The method of section 1, further comprising:

transmitting a second test signal on a second transmission channel with a first antenna at a first location in the electronic device; and receiving the second test signal on the second transmission channel with a second antenna at a second location in the electronic device.

Section 3. The method of section 1 or 2, further comprising transmitting and receiving on at least two channels.

Section 4. The method of any of sections 1-3, the first transmission channel having a frequency of 2.4 GHz.

Section 5. The method of any of sections 1-4, adjusting the transmission power of a third antenna based upon the material properties of the housing material.

Section 6. The method of any of sections 1-5, the first antenna being a Wi-Fi antenna.

Section 7. The method of any of sections 1-3, the first antenna being a cellular antenna.

Section 8. The method of any of sections 1-3, the first antenna being a near field communications antenna.

Section 9. The method of any of sections 1-8, further comprising transmitting a first test signal on a first transmission channel with a first antenna at a first location in the electronic device during a startup procedure of the electronic device.

Section 10. The method of any of sections 1-8, further comprising transmitting a first test signal on a first transmission channel with a first antenna at a first location in the electronic device during a transmission initialization procedure of the first antenna.

Section 11. The method of any of sections 1-10, determining a housing material further including determining a location of a component including the housing material.

Section 12. The method of any of sections 1-11, transmitting a first test signal including transmitting at 20 decibel milliwatts (dBm).

Section 13. The method of any of sections 1-12, determining a housing material further including determining a combination of housing materials.

Section 14. The method of any of sections 1-13, determining a housing material further including determining the housing material is not present in the plurality of materials and adjusting the transmission power including adjusting the transmission power to a safe transmission level.

Section 15. An electronic device comprising:

a first antenna;

a second antenna;

a processor in data communication with the first antenna and second antenna; and a hardware storage device in data communication with the processor, the hardware storage device having instructions stored thereon that, when executed by the processor, cause the processor to:

access data containing material properties relating to a plurality of materials, transmit a first test signal on a first transmission channel with a first antenna at a first location in the electronic device, receive the first test signal on the first transmission channel with a second antenna at a second location in the electronic device, determine a housing material of the electronic device based on a measured attenuation of the first test signal received by the second antenna based upon the data containing material properties relating to the plurality of materials, and adjust a transmission power of one of the first antenna and second antenna based upon the material properties of the housing material.

Section 16. The electronic device of section 15, further comprising a housing defining an interior space, the housing having the housing material, where the first antenna and the second antenna are positioned in the interior space.

Section 17. The electronic device of section 15, further comprising a first housing and a second housing that is movable relative to the first housing, the first housing having the housing material, where the first antenna is located in the first housing and the second antenna is located in the second housing.

Section 18. The electronic device of any of sections 15-17, further comprising an electrically insulating layer directly between the first antenna and the second antenna.

Section 19. A method for controlling wireless communication performance in an electronic device, the method including:

accessing data containing transmission properties relating to a plurality of materials;

transmitting a first test signal on a first transmission channel with a first antenna at a first location in the electronic device;

receiving the first test signal on the first transmission channel with a second antenna at a second location in the electronic device;

transmitting a second test signal on the first transmission channel with the second antenna at the first location in the electronic device;

receiving the second test signal on the first transmission channel with the first antenna at the second location in the electronic device;

determining a housing material of the electronic device based on a measured attenuation of the first test signal received by the second antenna, the second test signal received by the first antenna, and the data containing transmission properties relating to a plurality of materials; and adjusting a transmission power of a primary antenna based upon the transmission properties of the housing material.

Section 20. The method of section 19, further comprising selecting a primary antenna from the first antenna and the second antenna.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for controlling wireless communication performance in an electronic device, the method including:
   accessing data containing material properties relating to a plurality of materials;
   transmitting a first test signal on a first transmission channel with a first antenna at a first location in the electronic device;
   receiving the first test signal on the first transmission channel with a second antenna at a second location in the electronic device;
   determining a housing material of the electronic device based on a measured attenuation of the first test signal received by the second antenna based upon the data containing transmission properties relating to a plurality of materials; and
   adjusting a transmission power of one of the first antenna and the second antenna based upon the material properties of the housing material.

2. The method of claim 1, further comprising:
   transmitting a second test signal on a second transmission channel with a first antenna at a first location in the electronic device; and
   receiving the second test signal on the second transmission channel with a second antenna at a second location in the electronic device.

3. The method of claim 1, further comprising transmitting and receiving on at least two channels.

4. The method of claim 1, the first transmission channel having a frequency of 2.4 GHz.

5. The method of claim 1, adjusting the transmission power of a third antenna based upon the material properties of the housing material.

6. The method of claim 1, the first antenna being a Wi-Fi antenna.

7. The method of claim 1, the first antenna being a cellular antenna.

8. The method of claim 1, the first antenna being a near field communications antenna.

9. The method of claim 1, further comprising transmitting a first test signal on a first transmission channel with a first antenna at a first location in the electronic device during a startup procedure of the electronic device.

10. The method of claim 1, further comprising transmitting a first test signal on a first transmission channel with a first antenna at a first location in the electronic device during a transmission initialization procedure of the first antenna.

11. The method of claim 1, determining a housing material further including determining a location of a component including the housing material.

12. The method of claim 1, transmitting a first test signal including transmitting at 20 decibel milliwatts (dBm).

13. The method of claim 1, determining a housing material further including determining a combination of housing materials.

14. The method of claim 1, determining a housing material further including determining the housing material is not present in the plurality of materials and adjusting the transmission power including adjusting the transmission power to a safe transmission level.

15. An electronic device comprising:
   a first antenna;
   a second antenna;
   a processor in data communication with the first antenna and second antenna; and
   a hardware storage device in data communication with the processor, the hardware storage device having instructions stored thereon that, when executed by the processor, cause the processor to:
   access data containing material properties relating to a plurality of materials,
   transmit a first test signal on a first transmission channel with a first antenna at a first location in the electronic device,
   receive the first test signal on the first transmission channel with a second antenna at a second location in the electronic device,
   determine a housing material of the electronic device based on a measured attenuation of the first test signal received by the second antenna based upon the data containing material properties relating to the plurality of materials, and
   adjust a transmission power of one of the first antenna and second antenna based upon the material properties of the housing material.

16. The electronic device of claim 15, further comprising a housing defining an interior space, the housing having the housing material, where the first antenna and the second antenna are positioned in the interior space.

17. The electronic device of claim 15, further comprising a first housing and a second housing that is movable relative to the first housing, the first housing having the housing material, where the first antenna is located in the first housing and the second antenna is located in the second housing.

18. The electronic device of claim 15, further comprising an electrically insulating layer directly between the first antenna and the second antenna.

19. A method for controlling wireless communication performance in an electronic device, the method including:

accessing data containing transmission properties relating to a plurality of materials;

transmitting a first test signal on a first transmission channel with a first antenna at a first location in the electronic device;

receiving the first test signal on the first transmission channel with a second antenna at a second location in the electronic device;

transmitting a second test signal on the first transmission channel with the second antenna at the first location in the electronic device;

receiving the second test signal on the first transmission channel with the first antenna at the second location in the electronic device;

determining a housing material of the electronic device based on a measured attenuation of the first test signal received by the second antenna, the second test signal received by the first antenna, and the data containing transmission properties relating to a plurality of materials; and adjusting a transmission power of a primary antenna based upon the transmission properties of the housing material.

20. The method of claim 19, further comprising selecting a primary antenna from the first antenna and the second antenna.

* * * * *